US011531761B2

United States Patent
Beck et al.

(10) Patent No.: US 11,531,761 B2
(45) Date of Patent: Dec. 20, 2022

(54) HTTPS BOOT TO PROVIDE DECRYPTION KEY

(71) Applicant: Lenovo (Singapore) Pte. Ltd., Singapore (SG)

(72) Inventors: Kevin Wayne Beck, Raleigh, NC (US); Thorsten P. Stremlau, Morrisville, NC (US); Russell Speight VanBlon, Raleigh, NC (US); Joseph M. Pennisi, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 92 days.

(21) Appl. No.: 16/795,049

(22) Filed: Feb. 19, 2020

(65) Prior Publication Data
US 2021/0256133 A1  Aug. 19, 2021

(51) Int. Cl.
| | |
|---|---|
| *G06F 21/57* | (2013.01) |
| *G06F 21/78* | (2013.01) |
| *G06F 21/60* | (2013.01) |
| *H04L 9/08* | (2006.01) |
| *H04L 9/06* | (2006.01) |
| *H04L 29/08* | (2006.01) |
| *H04L 67/1097* | (2022.01) |

(52) U.S. Cl.
CPC .......... *G06F 21/575* (2013.01); *G06F 21/572* (2013.01); *G06F 21/602* (2013.01); *G06F 21/78* (2013.01); *H04L 9/0643* (2013.01); *H04L 9/0861* (2013.01); *H04L 9/0894* (2013.01); *H04L 67/1097* (2013.01)

(58) Field of Classification Search
CPC .... G06F 21/575; G06F 21/572; G06F 21/602; G06F 21/78; H04L 9/0643; H04L 9/0861; H04L 9/0894; H04L 67/1097
USPC ........................................................ 713/168
See application file for complete search history.

(56) References Cited

U.S. PATENT DOCUMENTS

| | | | |
|---|---|---|---|
| 8,468,580 B1 * | 6/2013 | Casey | G06F 21/606 726/4 |
| 9,838,205 B2 * | 12/2017 | Lundstrbm | H04L 63/126 |
| 10,985,967 B1 * | 4/2021 | Erez | H04L 41/22 |

(Continued)

OTHER PUBLICATIONS

"Using HTTP Boot to Install an Operating System on Lenovo ThinkSystem servers", LENOVO, May 2019.

(Continued)

*Primary Examiner* — Kambiz Zand
*Assistant Examiner* — Phuc Pham (57) ABSTRACT

Systems and methods are disclosed for generating a key based on at least one hardware component identifier for hardware of a first device and/or at least one piece of firmware code of the first device. The key may then be stored at a storage area accessible to the first device via hypertext transfer protocol secure (HTTPS) communication and the key may also be used to encrypt storage of the first device. Booting of the first device may then be facilitated based on HTTPS communication with a second device and using an extensible firmware interface (EFI) file and/or an IMG file stored at the second device. Then subsequent to at least partially facilitating the booting of the first device and based on verifying authentication credentials, the key may be transmitted to the first device to decrypt the storage of the first device.

20 Claims, 7 Drawing Sheets

(56) References Cited

U.S. PATENT DOCUMENTS

| | | | |
|---|---|---|---|
| 2006/0204949 A1* | 9/2006 | Fok | G06F 9/453 434/362 |
| 2009/0080662 A1* | 3/2009 | Thibadeau | G06F 21/31 380/286 |
| 2012/0163589 A1* | 6/2012 | Johnson | G06F 21/71 380/30 |
| 2015/0067328 A1* | 3/2015 | Yin | H04L 63/0807 713/168 |
| 2016/0239657 A1* | 8/2016 | Loughlin-Mchugh | G06F 21/45 |
| 2017/0228228 A1* | 8/2017 | Lin | H04L 41/046 |
| 2017/0286698 A1* | 10/2017 | Shetty | G06F 21/6218 |
| 2018/0165472 A1* | 6/2018 | Adams | G06F 21/83 |
| 2019/0190695 A1* | 6/2019 | Kaul | G09C 1/00 |
| 2020/0082390 A1* | 3/2020 | Mursalov | G06F 16/1824 |
| 2020/0341744 A1* | 10/2020 | Suryanarayana | G06F 8/65 |

OTHER PUBLICATIONS

HTTP Boot, GITHUB, Apr. 4, 2019, retrieved from https://github.com/tianocore/tianocore.github.io/wiki/HTTP-Boot.

* cited by examiner

HTTPS BOOT TO PROVIDE DECRYPTION KEY

FIELD

The present application relates to technically inventive, non-routine solutions that are necessarily rooted in computer technology and that produce concrete technical improvements.

BACKGROUND

Decryption keys can be used to decrypt encrypted storage areas of devices. However, as recognized herein, there are no sufficiently secure ways to ensure that these decryption keys are protected from tech-savvy hackers between manufacture of the device and use of the device by an end-user. This presents a computer-related, technological problem.

SUMMARY

Accordingly, in one aspect a method includes generating a key based on one or more of at least one hardware component identifier for hardware of a device and at least one piece of firmware code of the device. The method also includes storing the key at a hypertext transfer protocol secure (HTTPS)-based storage area, using the key to encrypt storage of the device, and providing the device to a third party with the storage encrypted. The third party may be an end-user, for example.

In some examples, the method may include generating the key based on both of the at least one hardware component identifier for hardware of a device and the at least one piece of firmware code of the device. Furthermore, in some examples the key may also be generated based on trusted platform module (TPM) data. The key may include a hash of the at least one hardware component identifier, the at least one piece of firmware code, the TPM data, and/or a salt.

In some implementations, the method may include using the key to encrypt storage of the device during manufacturing of the device.

Also in some implementations, the HTTPS-based storage area may be a HTTPS-based cloud storage area that may be located on a server that is different from the device.

Additionally, if desired the method may include facilitating booting of the device using an extensible firmware interface (EFI) file and/or an IMG file. The EFI file and/or IMG file may be stored at a server different from the device, where the server may be accessible to the device via HTTPS communication. Also note that the booting of the device may in some examples be an initial booting of the device subsequent to the device being provided to the third party.

Still further, in some examples the method may include authenticating a person associated with the third party subsequent to at least partially facilitating the booting and, responsive to authenticating the person, transmitting the key to the device using HTTPS communication. In other examples, the method may include authenticating a person associated with the third party subsequent to at least partially facilitating the booting, verifying identity and integrity of the device using the EFI file and/or IMG file responsive to authenticating the person, and transmitting the key to the device using HTTPS communication responsive to the verifying.

In another aspect, a device includes at least one processor and storage accessible to the at least one processor. The storage includes instructions executable by the at least one processor to receive a boot command and, responsive to receipt of the boot command, boot the device using Internet communication. The instructions are also executable to receive input of authentication credentials, transmit the authentication credentials to a server, communicate with the server to verify an identity of the device, and communicate with the server to decrypt at least one storage area of the device.

In some examples, the instructions may be executable to boot the device using an extensible firmware interface (EFI) file maintained by a hypertext transfer protocol secure (HTTPS) service and/or using an IMG file maintained by the HTTPS service. Also in some examples, the instructions may be executable to communicate with the server to verify integrity of the device and to communicate with the server to decrypt the at least one storage area of the device using a key generated based on at least one hardware component identifier for hardware of the device and/or at least one piece of firmware code of the device.

In another aspect, at least one computer readable storage medium that is not a transitory signal includes instructions executable by at least one processor of a first device to store a decryption key at a storage area accessible via Internet communication and to facilitate booting of a second device based on Internet communication with the second device. The booting is facilitated using an extensible firmware interface (EFI) file and/or an IMG file. The instructions are also executable to transmit the decryption key to the second device subsequent to at least partially facilitating the booting of the second device.

The details of present principles, both as to their structure and operation, can best be understood in reference to the accompanying drawings, in which like reference numerals refer to like parts, and in which:

DETAILED DESCRIPTION

Among other things, the present application discloses systems and methods for generation of a key based on component and firmware level state(s) of a device. The key may be, for example, a hash of unique hardware component identifiers, of firmware code, and of TPM keys, plus a salt. The key may then be uploaded to and/or stored at a secure https-based cloud escrow. This key may also be used to pre-encrypt storage of the device in manufacturing prior to the device being provided to an end-user. The storage may be encrypted using shared-key encryption, for example, where one key is used to both encrypt and decrypt the storage. However, reciprocal encryption/decryption key combinations may also be used consistent with present principles.

Then when the end-user receives the device including the already-encrypted storage and deploys the device, the device may boot from a secure boot protected EFI or IMG file in an https location or other secure location accessible via secure Internet/network communication (e.g., other Transport Layer Security (TLS) communication). The end-user may then authenticate to a designated authentication platform (e.g., corporate AD credentials) in order to access the key. The EFI or IMG file may then verify the integrity and identity of the device, log access to the key store to show that the key has been downloaded to the device, and then unlock access to the drive by decrypting the drive with the key. The logged access to the key store may then show the key as already used and the device as having been deployed.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
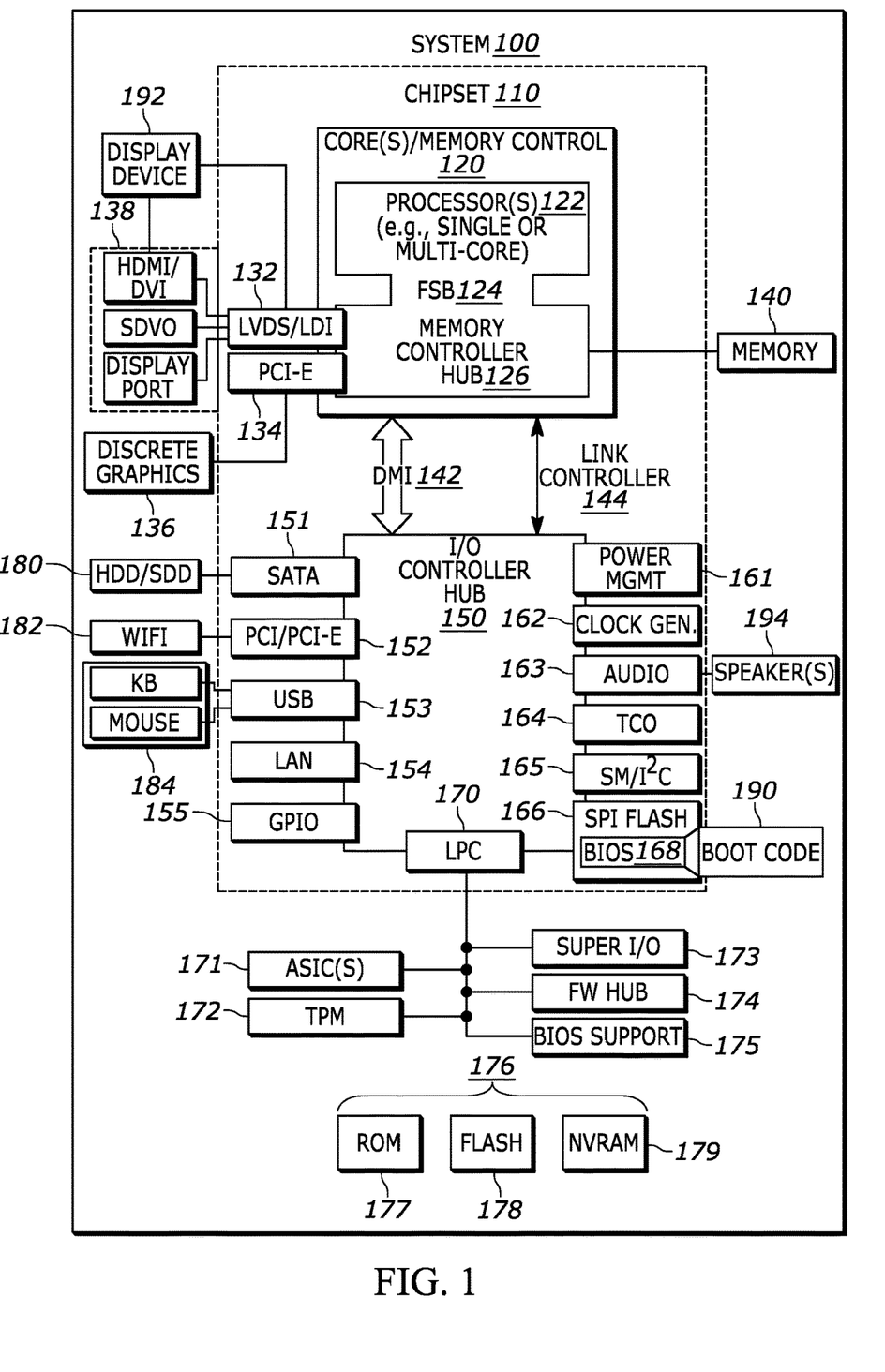
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
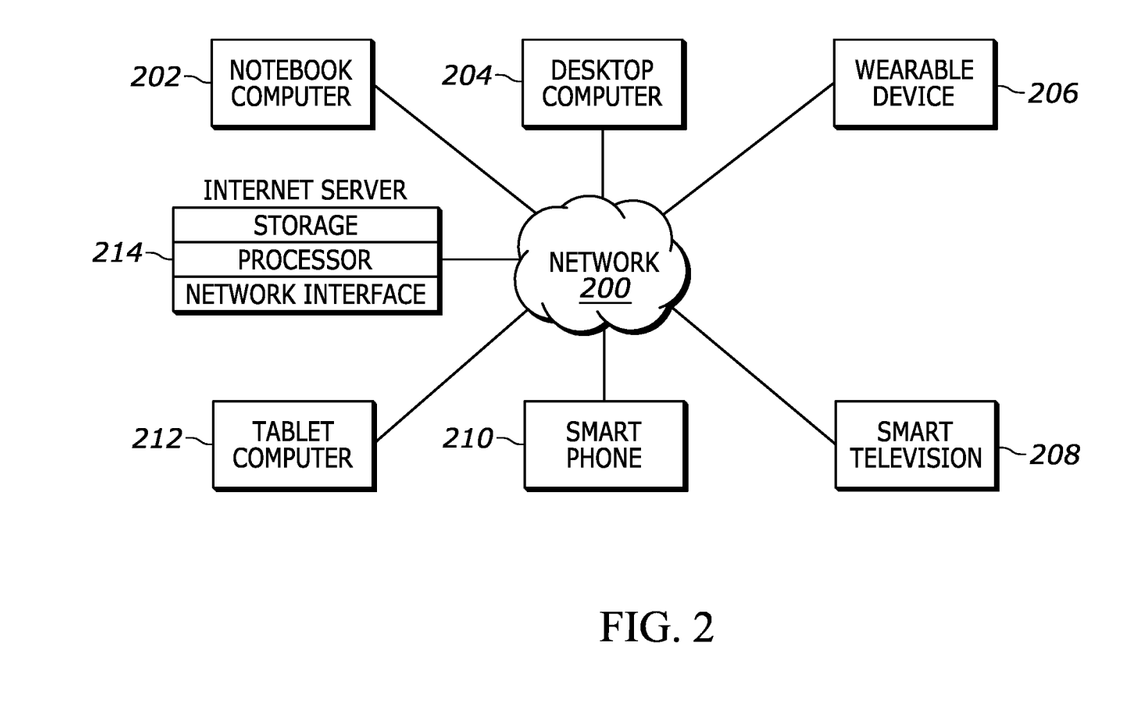
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, and a tablet computer 212. FIG. 2 also shows a server 214 such as an Internet server that may provide, to the devices 202-212, hypertext transfer protocol secure (HTTPS)-based cloud storage using Transport Layer Security (TLS). The server 214 may thus be accessible to the devices 202-212 via HTTPS communication (e.g., communicating over the Internet using an HTTPS connection). It is to be further understood that the devices 202-214 are configured to communicate with each other over the network 200 to undertake present principles.

Figure 3:
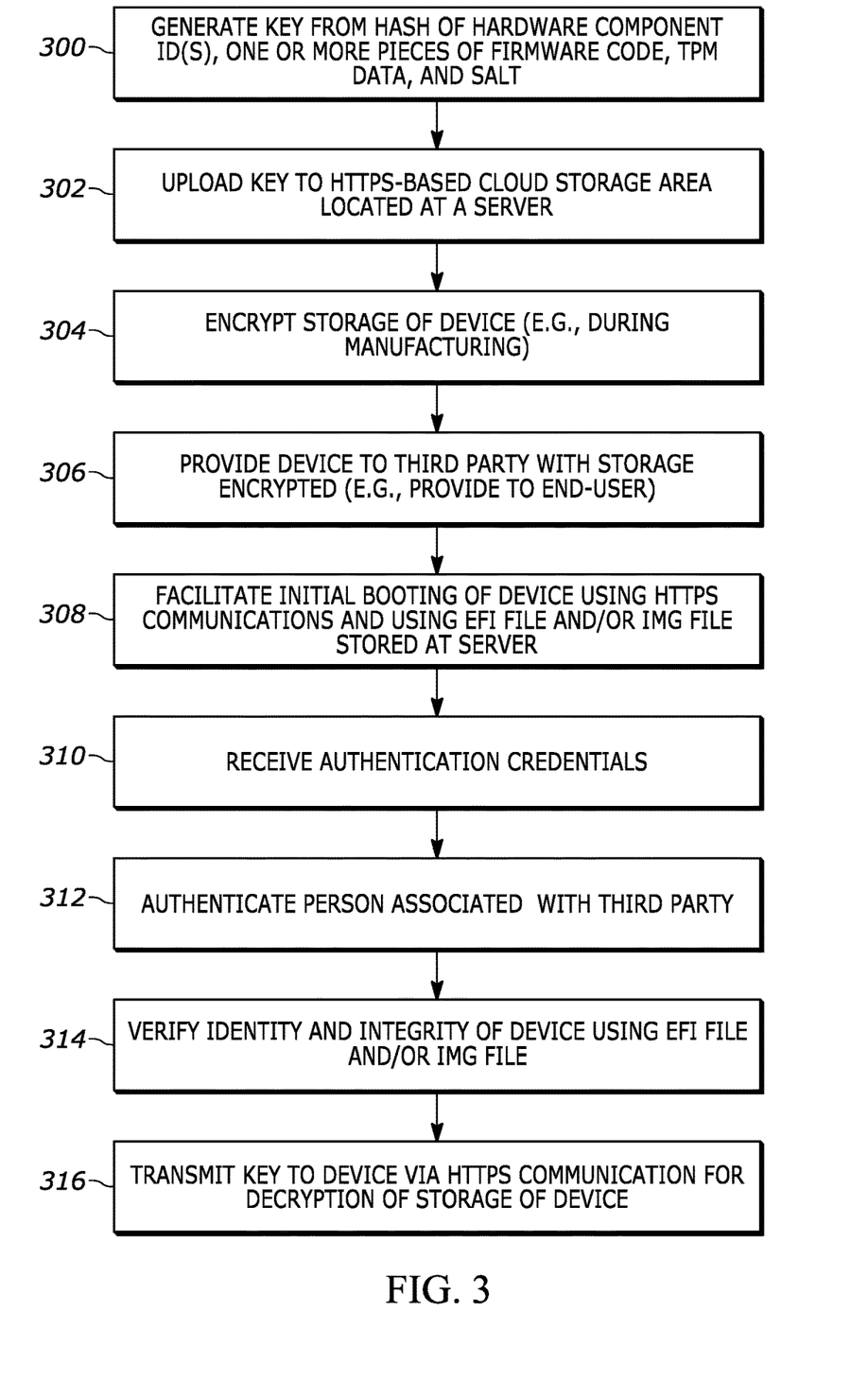
FIG. 3 is a flow chart setting forth an example process that may be performed by a manufacturer or provider of a device consistent with present principles.

Referring now to FIG. 3, it shows a flow chart of an example process that may be performed by a manufacturer or provider of a device in order to securely deliver a decryption key to the device after the device has had its storage encrypted and has been provided to a third party. The third party may be an end-user, corporate client, middle-man entity who will eventually provide the device to an end-user, etc. Once delivered to the device, the key may then be used to decrypt the storage, such as a hard disk drive (HDD) or solid state drive (SSD), so it can be used by the device.

Beginning at block 300 a provider computer different from the device itself may be used to generate the key, which may essentially act as a password to decrypt the storage at a later time as will be described further below. The key may be generated based on one or more hardware component identifiers (ID) for hardware of the device and/or one or more pieces of firmware code of the device. The ID(s) may include a manufacturer ID or serial number for the device, a central processing unit ID or serial number for the central processing unit of the device, a motherboard ID or serial number for the motherboard of the device, a random-access memory ID or serial number for random-access memory of the device, a HDD or SSD ID or serial number for HDD or SSD of the device, etc. The firmware code may be firmware for a keyboard of the device, a display of the device, a mouse or trackpad of the device, a printer of the device, a scanner of the device, a camera of the device, a universal serial bus (USB) port of the device, a battery of the device, a battery charger of the device, speakers of the device, a microphone of the device, a GPS transceiver of the device, an accelerometer or gyroscope of the device, the basic input/output system (BIOS) of the device, the motherboard of the device, a network interface of the device, etc.

In some examples, at block 300 the key may also be generated based on trusted platform module (TPM) data from a TPM on the device. The TPM data may include, for example, one or more additional, different encryption/decryption keys stored in the TPM. The TPM itself may be a chip coupled to the device's motherboard and may securely store the additionally, different keys.

Still further, the key that is generated at block 300 may be generated using a hash function/algorithm to render a hash of the hardware component IDs, the piece(s) of firmware code and even firmware code checksums, the TPM data, and even a salt. The salt may be a random number provided by the manufacturer or provider and may be unique to that particular device so that it is not used for similar hashes for other devices also produced by the manufacturer or provider.

From block 300 the process may proceed to block 302. At block 302 the provider computer may upload the key to and/or store the key at a hypertext transfer protocol secure (HTTPS)-based cloud storage area on a remotely-located server that may act as an escrow for the key that is generated at block 300. The key itself may be uploaded/stored at block 302 using HTTPS communication, though other types of communication may also be used. Also, note that along with the key, a device identifier may be uploaded/stored and associated with the key at the server.

From block 302 the process may flow to block 304. At block 304 the provider computer may, during manufacturing, use the key generated at block 300 and an encryption algorithm to encrypt storage (e.g., HDD or SSD) of the device over a wired or wireless connection to the device. Additionally or alternatively, the device itself may be used to encrypt its storage and, in some examples, the storage may be self-encrypting using the key. The encryption algorithm that is used may be DES/3DES, Blowfish, AES, MD5, SHA 1, HMAC, etc. or even a unique algorithm developed by the provider/manufacturer itself.

From block 304 the process may then proceed to block 306. At block 306 the device may be provided to the third party with the storage encrypted.

Thereafter, the process may flow to block 308 where the remotely-located server from above that stores the key (or even a different remotely-located server) may facilitate an initial booting of the device using HTTPS communication between the device and server, where the initial booting may be HTTPS booting. For example, HTTPS booting may occur from a secure boot protected extensible firmware interface (EFI) file stored at the server and/or from an IMG file (e.g., a raw disk image file format with .img filename extension) stored at the server. Also at block 308 in some examples, a guest operating system may be downloaded from the server/file using HTTPS communication for local install on the device after being downloaded.

Then, subsequent to at least partially facilitating the booting, the process may flow to block 310 where authentication credentials may be electronically received by the server via HTTPS communication after being provided by a user to the device itself. The credentials may include a username and password that the user already uses to login to system resources of the third party (e.g., his or her company), for example. Then at block 312 the server may authenticate the user by, e.g., ensuring that the username and password match a predefined username and password set as already stored at the server. Then at block 314 and responsive to authenticating the user, the server may verify the identity and integrity of the device using the EFI file and/or IMG file.

To verify the identity of the device, the device ID, manufacturer ID, and/or device serial number may be checked against a list of IDs/numbers already stored at the server to verify the device as the one already associated at the server with the key generated at block 300.

To verify the integrity of the device, an integrity check may be ran by the EFI file and/or IMG file itself to validate the integrity of the device's operating system, individual software application files and/or other stored data to ensure that those items have not been tampered with after the device left the manufacturer's control. To do so, a verification method may be used to compare the current file state of the device against a baseline file state for the device that was identified prior to the device being provided to the third party at block 306. For instance, the comparison may involve taking a cryptographic checksum of the original baseline file calculated prior to providing the device to the third party at block 306 and then comparing it with a calculated cryptographic checksum of the current file state of the device.

If either or both of identity verification and integrity verification fail, the process may end and the server may not provide the key generated at block 300 to the device. However, assuming identity verification and integrity verification are successful, the process may move to block 316 where the server may transmit the key to the device via HTTPS communication (or even another type of communication) for the device to then decrypt the storage/storage area of the device that was encrypted at block 304 using the key. Also at block 316, the server may log or note that the key has been accessed by the device so that the server knows not to provide the key again, e.g., should an imposter try to spoof the device to gain access to the key at a later time for nefarious purposes. Thus, it is to be more generally understood that the key may be provided only a single time to a device by the server, e.g., based on an initial HTTPS booting of the device after it has been provided to a third party.

Figure 4:
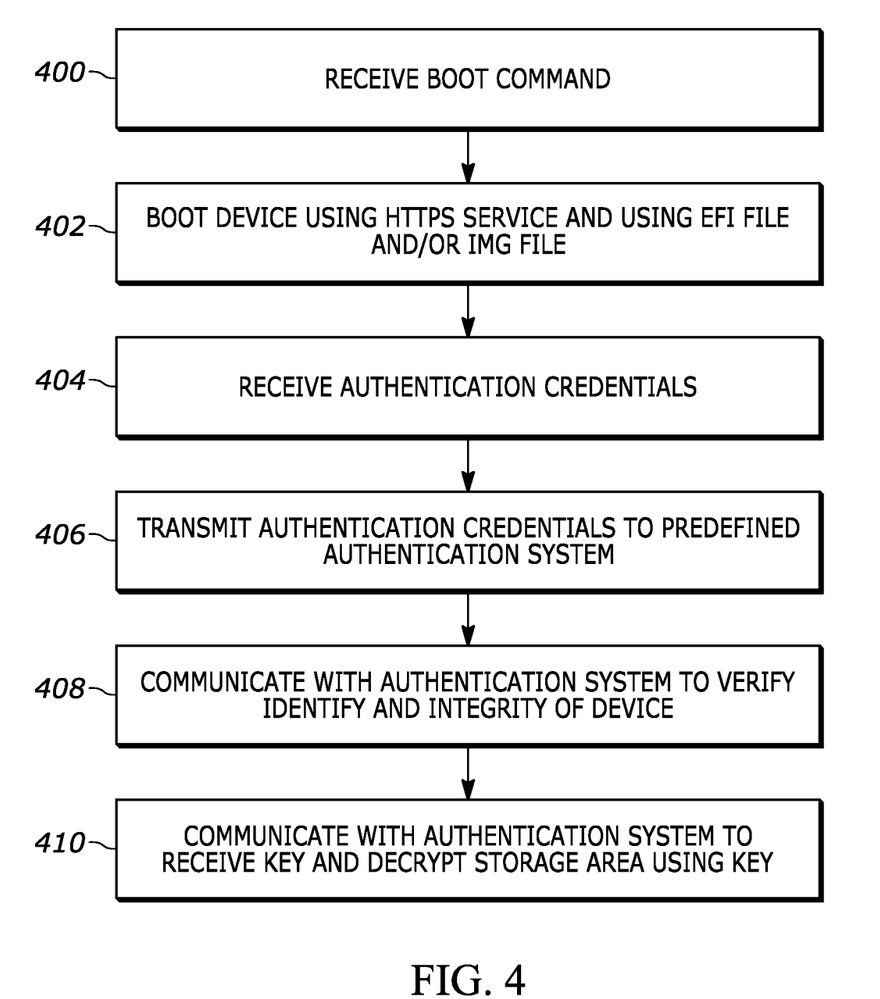
FIG. 4 shows example logic that may be executed by an example client device that has its storage encrypted consistent with present principles.

Now describing FIG. 4, it shows example logic that may be executed by the device described above that has its storage encrypted prior to being provided to a third party. Beginning at block 400, the device may receive a boot command based on, e.g., user selection of a power button on the device.

The logic may then proceed to block 402 where, responsive to the boot command, the device may be booted using an HTTPS service operating on a server (such as the server described above in reference to FIG. 3). Specifically, at block 402 the device may transmit a request for boot files to the HTTPS service and may then boot from an EFI file and/or IMG file maintained at the server that provides the boot files to the device through an HTTPS connection. Also at block 402 or at a later time in the process, in some examples a guest operating system may be downloaded from the server and installed at the device.

From block 402 the logic may then proceed to block 404. At block 404 the device may receive authentication credentials from a user, e.g., via a keyboard accessible to the device or via a touch-enabled display accessible to the device. The logic may then proceed to block 406 where the device may transmit the authentication credentials received at block 404 to a predefined authentication system that may be maintained on the server.

Thereafter the logic may proceed to block 408 where the device may communicate with the server to verify the identity and integrity of the device as described above.

Responsive to successful verification of the identify and integrity of the device, the logic may move to block 410 where the device may communicate with the server to decrypt the storage/storage area of the device that was encrypted by the manufacturer or provider of the device prior to the device being provided to the end-user. The storage/storage area may be decrypted using the key generated according to block 300 above, as received at block 410 based on the communication via a secure HTTPS connection.

Also at block 410, the device may store the received key in a secure area of its local storage and/or in its TPM specifically. Additionally, note that from that point on the device may boot its operating system (e.g., a guest operating system) from local storage of the device rather than using an HTTPS boot.

Figure 5:
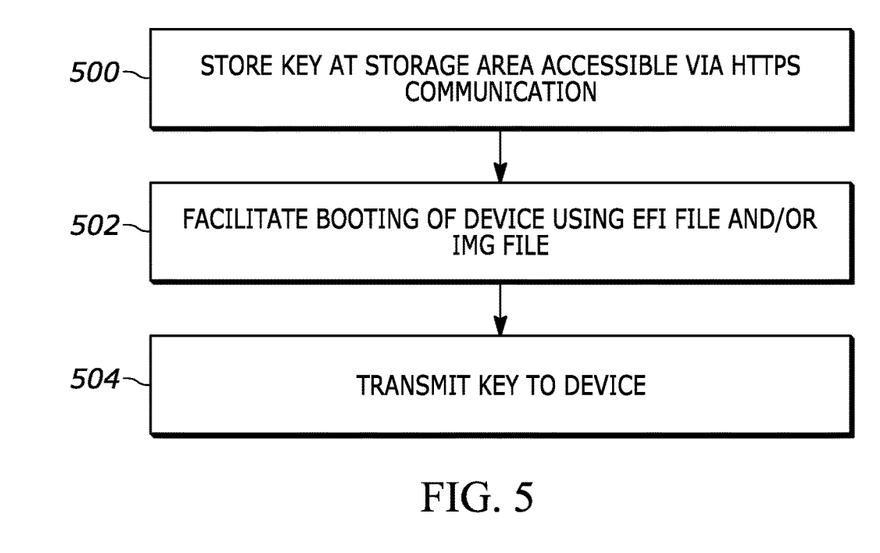
FIG. 5 shows example logic that may be executed by a manufacturer or provider's server consistent with present principles.

Continuing the detailed description in reference to FIG. 5, it shows example logic that may be executed by a manufacturer or provider's server consistent with the flow chart of FIG. 3. However, also note that the logic of FIG. 5 may be executed by a separate escrow agent server or other party's server that may maintain decryption keys provided by the manufacturer or provider so that the server may subsequently provide them to end-user devices to decrypt their storage areas consistent with present principles. For example, FIG. 5 may be executed by a server maintained by a company making a bulk purchase of computers for its employees so that the employees may then HTTPS boot their devices from the server.

Beginning at block 500, the server may store a decryption key at one of its own local storage areas that may be accessible to other devices via HTTPS communication consistent with present principles. The server may store the decryption key after it has been uploaded/transmitted securely and electronically by the manufacturer/provider using a remotely-located manufacturer computer, or after being hand-delivered and uploaded/stored locally to the server executing the logic of FIG. 5.

From block 500 the logic may then proceed to block 502. At block 502 the server may facilitate booting of the end-user device using an EFI file and/or IMG file maintained on the server. For instance, at block 502 the server may execute the EFI file or IMG file and communicate with the device over an HTTPS connection to boot the device from the file.

The logic may then proceed to block 504 where the server may perform authentication as well as device identity and integrity verification as described herein and then transmit the appropriate decryption key to the device responsive to successful verification.

Figure 6:
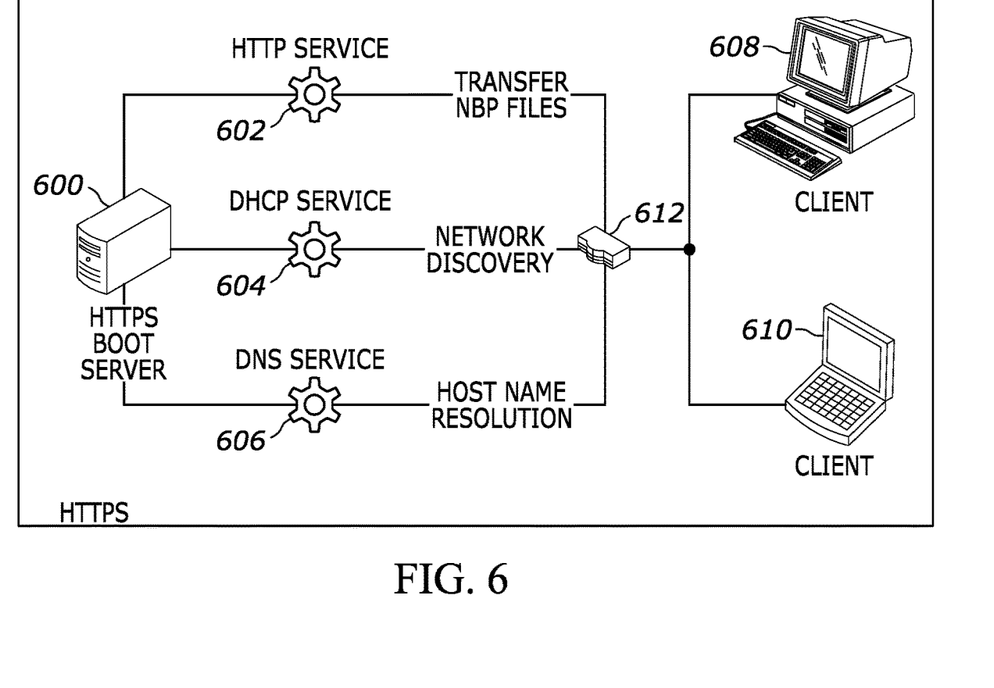
FIG. 6 shows example network topology consistent with present principles.

Now in reference to FIG. 6, it shows example network topology consistent with present principles for performing an HTTPS boot in a client-server communication-based application. As indicated in FIG. 6, HTTPS booting itself may combine Dynamic Host Configuration Protocol (DHCP), Domain Name System (DNS), and Hypertext Transfer Protocol (HTTP) to provide the capability for system/end-user device deployment and configuration over a network.

Unified Extensible Firmware Interface (UEFI) Specification V2.5 sets forth protocols that are related to HTTPS boot in order to boot a system from a Uniform Resource Identifier (URI) using an HTTPS connection. Users may thus boot a system/device with Network Boot Program (NBP) and HTTP boot technology. HTTPS booting is useful because can handle transmission of relatively large files and scale to much larger distances. Thus, multi-megabyte files such as a Linux kernel or a root file system may be easily downloaded from servers that are not on the system/device's local area network.

An example network configuration supporting UEFI HTTPS boot may involve several network-related systems, either HTTP, DHCP and/or DNS servers deployed on one physical machine, or separate physical machines. The HTTP boot system/client(s) can access the HTTP boot server via the HTTPS protocol.

Thus, as shown in FIG. 6, an HTTPS Boot Server 600 is shown and may be a server with HTTPS service, DHCP service, and DNS service enabled to perform HTTPS booting. An HTTPS service 602 may be located either inside the local intranet for the system/device to be booted or across networks such as on the Internet. As also shown, a NBP may be deployed on the HTTPS server 600. For example, a NBP file "core.efi" may be used as the boot resource. NBP may be executed on the HTTP boot system/client, which may include installing an operating system (or even running a service OS for maintenance and recovery tasks).

As also shown in FIG. 6, a DHCP service 604 with HTTPS boot extension may be used for boot service discovery. Besides host configuration information such as address, subnet, and name-server, the DHCP service 604 may also provide the NBP locations in URI format on the HTTPS server 600.

A DNS service 606 is also shown and may be used in the HTTPS boot system in some examples. The DNS service 606 may provide standard domain name resolution service if it is desired to translate more readily memorized domain names to the numerical IP addresses.

Thus, systems/clients 608, 610 may be devices provided to third parties such as end-users consistent with present principles. The clients 608, 610 may initiate the communication with HTTP Boot server 600 through a secure router or gateway 612 in order to boot and even install an operating system (e.g., guest operating system such as Windows, Mac's OS, Linux, etc.).

Thus, a client may acquire a network address from a DHCP server and then download a NBP to execute it in the network. An information exchange sequence in an HTTPS boot scenario may include, for example, the client initiating the DHCP process by broadcasting a DHCP request containing an HTTP boot identifier. Should a DHCP server with HTTP boot extension be available, a boot resource location in URI format may be provided to the client. The URI may point to the NBP that is appropriate for the client's request. In some examples, the client may then use the HTTPS protocol to download the NBP from the HTTPS server to its memory (e.g., RAM). The client may then execute the downloaded NBP image (e.g., EFI or IMG file). This program may then use other UEFI interfaces for further system setup based on the NBP design.

Figure 7:
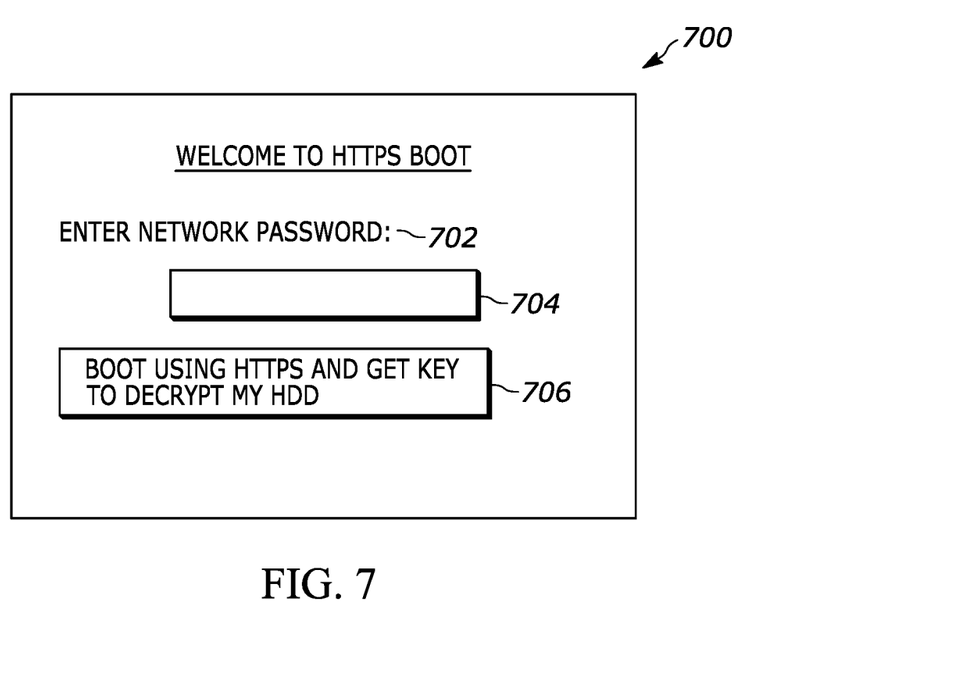
FIG. 7 shows an example graphical user interface (GUI) that may be presented on the display of a client device consistent with present principles.

Now in reference to FIG. 7, it shows an example graphical user interface (GUI) 700 that may be presented on the display of a client/end-user device consistent with present principles. The GUI 700 may be presented on the display using BIOS, for example, upon a user pressing a power button on the device for the first time after receiving the device from the manufacturer or other provider (e.g., third party middle man).

As shown, the GUI 700 may include a prompt 702 for the user to use the device's keyboard to enter a network password into box 704 in order to communicate over the Internet through a local area network (LAN) such as a home or business Wi-Fi network. Once a correct network password has been entered into box 704, the user may select the selector 706 using touch or cursor input. Selection of the selector 706 may cause the device to communicate through the LAN and Internet with a server for HTTPS booting of the device consistent with present principles.

Figure 8:
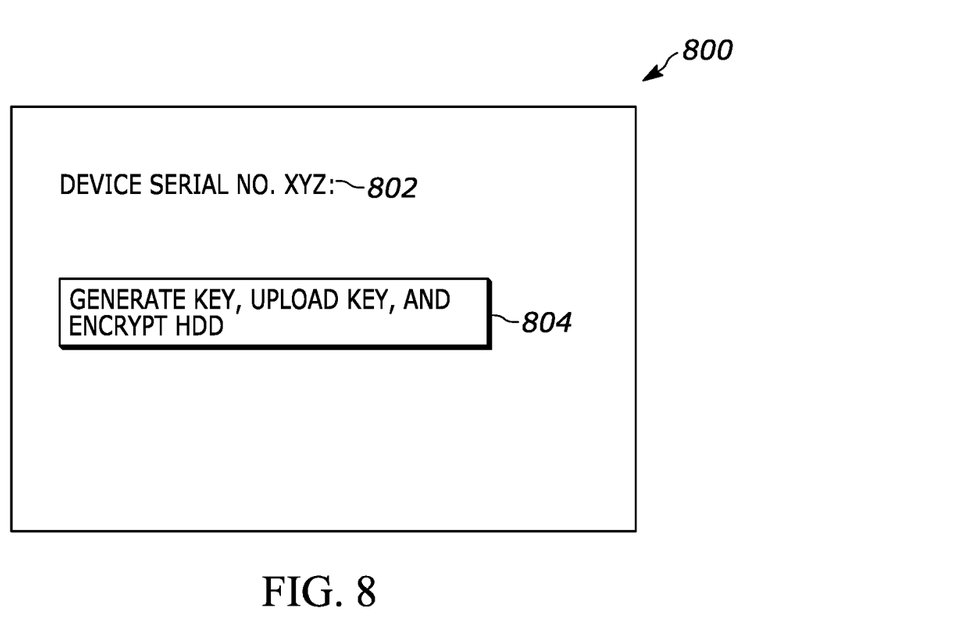
FIG. 8 shows an example GUI that may be presented the display of a manufacturer's computer consistent with present principles.

Now describing FIG. 8, it shows an example GUI 800 that may be presented a display of a manufacturer's computer consistent with present principles. As shown, the GUI 800 may indicate the serial number 802 of the client/end-user device that is being configured.

A selector 804 is also shown on the GUI 400. The selector 804 may be selectable to command the manufacturer's computer to initiate a process to generate a key from hardware components, firmware, etc. of the device, upload/store the key to a server at which the client device may access the key later as described herein, and then encrypt the device's local storage consistent with present principles so that the device may then be provided to a third party.

Figure 9:
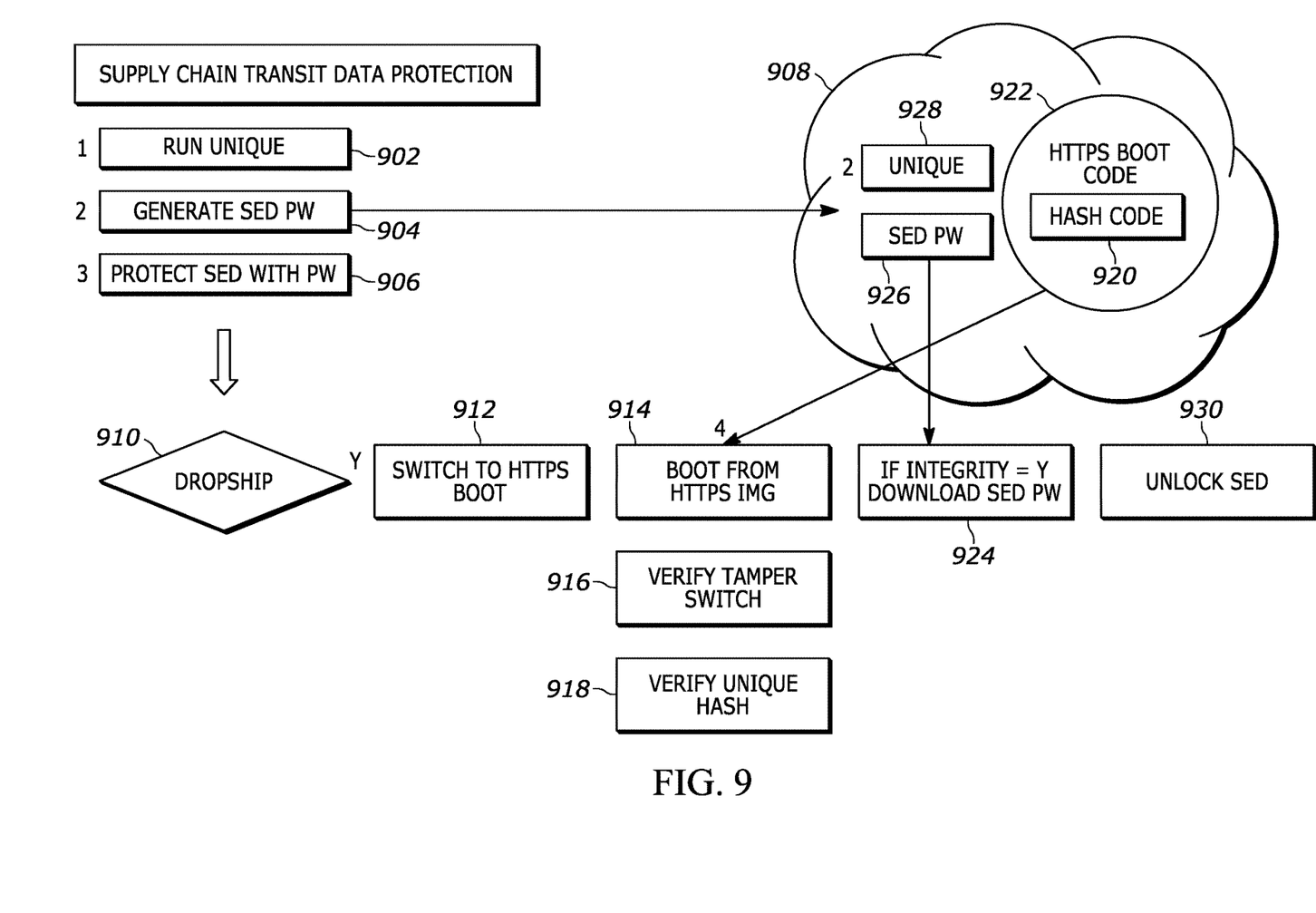
FIG. 9 shows a supply chain transit data protection diagram consistent with present principles.

In reference to FIG. 9, a supply chain transit data protection diagram is shown. Unique software 900 may be ran to generate a self-encrypting drive (SED) password (abbreviated "PW" below) to use as a decryption key consistent with present principles. Then at 906 the SED may be protected (e.g., encrypted) with the PW. The PW may then be uploaded/stored to a cloud service 908 as shown, and then the SED may be incorporated into a client device that is dropshipped 910 to a third party.

The third party may then switch the device to HTTPS booting 912 to, at 914, boot the client device from an HTTPS IMG (or EFI) file based on communication with the cloud service 908. At 916, the client device may communicate with the service 908 to receive a hash code 920 from within the HTTPS boot code 922 in order to verify a tamper switch 916 and unique hash 918 (e.g., a hash of a random salt) of the client device in order to perform client device ID verification.

As also shown in FIG. 9, once client device ID and integrity have been verified, the SED PW 926 may be downloaded 924 along with other unique, device-specific data 928. Then at 930 the SED may be unlocked/decrypted using the SED PW.

It may now be appreciated that present principles provide for an improved computer-based user interface that improves the functionality, secure boot capability, and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:
1. A device, comprising:
at least one processor; and
storage accessible to the at least one processor and comprising instructions executable by the at least one processor to:
receive a first boot command to boot an operating system of the device;
responsive to receipt of the first boot command, transmit a request to boot the device using Internet communication and using one or more boot files executed by at least one server;
facilitate booting of the device using hypertext transfer protocol secure (HTTPS) communication to boot the device using Internet communication and using the one or more boot files executed by the at least one server;

while the device is booted via the at least one server, receive input of authentication credentials;

while the device is booted via the at least one server, transmit the authentication credentials to the at least one server;

while the device is booted via the at least one server, communicate with the at least one server to verify an identity of the device;

while the device is booted via the at least one server, communicate with the at least one server to download a decryption key and use the decryption key to decrypt at least one persistent storage area of the device; and responsive to receipt of a second boot command received after the first boot command, boot the operating system of the device from local storage of the device rather than via the at least one server.

2. The device of claim 1, wherein the instructions are executable to:

boot the device via the at least one server using one or more of: an extensible firmware interface (EFI) file maintained by an HTTPS service, an IMG file maintained by the HTTPS service.

3. The device of claim 1, wherein the instructions are executable to:

communicate with the at least one server to verify integrity of the device by comparing a current file state of the device against a baseline file state for the device.

4. The device of claim 1, wherein the instructions are executable to:

present a graphical user interface (GUI) on a display, the GUI comprising a selector that is selectable to provide the first boot command, wherein the GUI is presented under control of a basic input/output system (BIOS) rather than being presented via a guest operating system of the device.

5. The device of claim 4, wherein the GUI is presented responsive to user selection of a power button on the device a first time after the device is received from a third party.

6. The device of claim 4, wherein the GUI comprises a prompt to enter a network password to communicate over the Internet to boot the device via the at least one server.

7. The device of claim 1, wherein the instructions are executable to:

while the device is booted via the at least one server, store the decryption key in a trusted platform module (TPM) of the device.

8. The device of claim 1, wherein the persistent storage area comprises one or more of: a hard disk drive of the device, a solid state drive of the device.

9. At least one computer readable storage medium (CRSM) that is not a transitory signal, the computer readable storage medium comprising instructions executable by at least one processor to:

store a key at a storage area of at least one server accessible via Internet communication;

use the key to encrypt local storage of a client device different from the at least one server;

use the at least one server to facilitate booting of the client device and subsequent installation of a guest operating system at the client device based on Internet communication between the at least one server and the client device, the booting facilitated using one or more files provided from the at least one server and stored in random access memory (RAM) of the client device both while booting is facilitated via the at least one server and while the local storage is encrypted, the one or more files comprising one or more of: an extensible firmware interface (EFI) file, an IMG file;

while booting is facilitated via the at least one server and based on booting the client device using the EFI file and/or IMG file stored in the RAM, authenticate a user of the client device based on input to the client device;

while booting is facilitated via the at least one server and responsive to authentication of the user, use the EFI file and/or IMG file to verify integrity of the client device;

while booting is facilitated via the at least one server and responsive to verification of the integrity of the client device failing, decline to transmit the key to the client device; and while booting is facilitated via the at least one server and responsive to verification of the integrity of the client device being successful, transmit the key to the client device.

10. The CRSM of claim 9, wherein the instructions are executable to:

responsive to verification of the integrity of the client device being successful, log that the key has been provided to the client device.

11. The CRSM of claim 9, wherein the key is generated at least in part based on a hash of firmware code of the client device, wherein the firmware code is firmware code for an input device of the client device.

12. A method, comprising:

receiving a first boot command to boot an operating system of a device;

responsive to receiving the first boot command, transmitting a request to boot the device using Internet communication and using one or more boot files executed by at least one server;

facilitating booting of the device using hypertext transfer protocol secure (HTTPS) communication to boot the device using Internet communication and using the one or more boot files executed by the at least one server;

while the device is booted via the at least one server, receiving input of authentication credentials;

while the device is booted via the at least one server, transmitting the authentication credentials to the at least one server;

while the device is booted via the at least one server, communicating with the at least one server to verify an identity of the device;

while the device is booted via the at least one server, communicating with the at least one server to download a decryption key and use the decryption key to decrypt at least one persistent storage area of the device; and responsive to receiving a second boot command subsequent to the first boot command, booting the operating system of the device from local storage of the device rather than via the at least one server.

13. The method of claim 12, comprising:

booting the device via the at least one server using an extensible firmware interface (EFI) file maintained by an HTTPS service.

14. The method of claim 12, comprising:

booting the device via the at least one server using an IMG file maintained by an HTTPS service.

15. The method of claim 12, comprising:

communicating with the at least one server to verify integrity of the device by comparing a current file state of the device against a baseline file state for the device.

16. The method of claim 12, comprising:

presenting a graphical user interface (GUI) on a display, the GUI comprising a selector that is selectable to provide the first boot command, wherein the GUI is presented under control of a basic input/output system (BIOS) rather than being presented via a guest operating system of the device.

17. The method of claim 16, wherein the GUI is presented responsive to user selection of a power button on the device a first time after the device is received from a third party.

18. The method of claim 16, wherein the GUI comprises a prompt to enter a network password to communicate over the Internet to boot the device via the at least one server.

19. The method of claim 12, comprising:
   while the device is booted via the at least one server, storing the decryption key in a trusted platform module (TPM) of the device.

20. The method of claim 12, wherein the persistent storage area comprises one or more of: a hard disk drive of the device, a solid state drive of the device.

\* \* \* \* \*